United States Patent
Kim et al.

(10) Patent No.: US 10,790,540 B2
(45) Date of Patent: Sep. 29, 2020

(54) LITHIUM ION CONDUCTIVE SULFIDE-BASED SOLID ELECTROLYTE COMPRISING INDIUM SELENIDE AND A METHOD FOR PREPARING THE SAME

(71) Applicant: KOREA INSTITUTE OF SCIENCE AND TECHNOLOGY, Seoul (KR)

(72) Inventors: Hyoungchul Kim, Seoul (KR); Hae-Weon Lee, Seoul (KR); Byung Kook Kim, Seoul (KR); Jong Ho Lee, Seoul (KR); Ji-Won Son, Seoul (KR); Hun-Gi Jung, Seoul (KR); Eu Deum Jung, Seoul (KR); Sung Jun Choi, Seoul (KR); Bin Na Yoon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 189 days.

(21) Appl. No.: 15/994,269

(22) Filed: May 31, 2018

(65) Prior Publication Data
US 2019/0051932 A1   Feb. 14, 2019

(30) Foreign Application Priority Data

Aug. 8, 2017  (KR) .................. 10-2017-0100052

(51) Int. Cl.
| | |
|---|---|
| *H01M 10/0562* | (2010.01) |
| *C01B 17/02* | (2006.01) |
| *C01B 17/22* | (2006.01) |
| *H01M 4/02* | (2006.01) |
| *H01M 10/052* | (2010.01) |

(52) U.S. Cl.
CPC ......... *H01M 10/0562* (2013.01); *C01B 17/02* (2013.01); *C01B 17/22* (2013.01); *H01M 4/02* (2013.01); *H01M 10/052* (2013.01); *H01M 2004/027* (2013.01); *H01M 2004/028* (2013.01); *H01M 2300/0068* (2013.01)

(58) Field of Classification Search
CPC .. H01M 10/0562; H01M 10/052; H01M 4/02; H01M 2004/028; H01M 2004/027; H01M 2300/0068; C01B 17/22; C01B 17/02; H01B 1/10
USPC ........................................................ 429/304
See application file for complete search history.

(56) References Cited

U.S. PATENT DOCUMENTS

| | | |
|---|---|---|
| 2013/0149567 A1 | 6/2013 | Schaefer |
| 2014/0193693 A1 | 7/2014 | Hoshina et al. |
| 2016/0351889 A1* | 12/2016 | Swonger ............... H01M 4/382 |

FOREIGN PATENT DOCUMENTS

| | | |
|---|---|---|
| JP | 2001-351611 A | 12/2001 |
| KR | 10-2017-0065982 A | 6/2017 |
| KR | 10-1747938 B1 | 6/2017 |

* cited by examiner

*Primary Examiner* — Gary D Harris
(74) *Attorney, Agent, or Firm* — Birch, Stewart, Kolasch & Birch, LLP

(57) ABSTRACT

The present invention relates to a lithium-ion-conductive sulfide-based solid electrolyte which contains lithium (Li), sulfur (S), phosphorus (P), indium (In) and selenium (Se) and has a crystal structure of InSe and a method for preparing the same.

12 Claims, 4 Drawing Sheets

LITHIUM ION CONDUCTIVE SULFIDE-BASED SOLID ELECTROLYTE COMPRISING INDIUM SELENIDE AND A METHOD FOR PREPARING THE SAME

CROSS-REFERENCE TO RELATED APPLICATIONS

This application claims, under 35 U.S.C. § 119, the priority of Korean Patent Application No. 10-2017-0100052, filed on Aug. 8, 2017, in the Korean Intellectual Property Office, the disclosure of which is incorporated herein by reference in its entirety.

BACKGROUND

(a) Technical Field

The present invention relates to a lithium-ion-conductive sulfide-based solid electrolyte containing indium selenide ($In_2Se_3$), which has a different crystal structure and improved atmospheric stability as compared to existing ones, and a method for preparing the same.

(b) Background Art

Higher stability and high energy density are required for the secondary batteries used in electronic devices such as mobile phones, notebook computers, etc. and means of transportation such as hybrid vehicles, electric vehicles, etc.

However, because most of the existing secondary batteries adopt cells based on organic solvents (organic liquid electrolytes), they show limitations in improvement of stability and energy density.

Meanwhile, all-solid-state batteries using inorganic solid electrolytes are drawing a lot of attention recently because a cell can be prepared safely and simply without the use of an organic solvent.

However, the lithium-phosphorus-sulfur (Li—P—S, LPS)-based solid electrolyte, which is the representative solid electrolyte for the all-solid-state battery developed thus far, has problems such as low lithium ion conductivity at room temperature, unstable crystal phase, weak atmospheric stability, limited processability and narrow high-conductivity phase composition and many researches are being conducted for improvement of large-scale producibility and applicability.

In this regard, US Patent Publication No. 2014-0193693 aimed to increase lithium ion conductivity by adding elements such as aluminum (Al), silicon (Si), iron (Fe), nickel (Ni), zirconium (Zr), etc. to a sulfide-based solid electrolyte such as thio-LISICON, etc. However, the degree of improvement was insignificant and atmospheric stability, high-conductivity phase composition, etc. were not improved at all.

REFERENCES OF THE RELATED ART

Patent Document

US Patent Publication No. 2014-0193693

SUMMARY

The present invention is directed to providing a lithium-ion-conductive sulfide-based solid electrolyte containing indium selenide, which exhibits superior charge-discharge performance and high energy efficiency and is capable of realizing an all-solid-state battery with a long life span, and a method for preparing the same.

The purpose of the present invention is not limited to that described above. The purpose of the present invention will become more apparent from the following description and will be realized by the means described in the claims and combinations thereof.

The lithium-ion-conductive sulfide-based solid electrolyte according to an exemplary embodiment of the present invention contains lithium (Li), sulfur (S), phosphorus (P), indium (In) and selenium (Se).

The lithium-ion-conductive sulfide-based solid electrolyte may have a crystal structure of InSe.

The lithium-ion-conductive sulfide-based solid electrolyte may show XRD peaks of InSe at 2θ=20-22°, 2θ=26-28°, 2θ=38-40° and 2θ=44-46° when subjected to X-ray diffraction (XRD) pattern measurement using Cu Kα radiation.

The lithium-ion-conductive sulfide-based solid electrolyte may be represented by Chemical Formula 1:

$(Li_2S)_a \cdot (P_2S_5)_b \cdot (In_2Se_3)_c$  [Chemical Formula 1]

wherein $0.5 \leq a \leq 0.8$, $0.1 \leq b \leq 0.4$, $0.01 \leq c \leq 0.3$ and $a+b+c=1$.

In Chemical Formula 1, a, b and c may satisfy the following condition: $0.65 \leq a \leq 0.8$, $0.15 \leq b \leq 0.25$ and $0.02 \leq c \leq 0.2$.

The lithium-ion-conductive sulfide-based solid electrolyte may have an ion conductivity after exposure to the atmosphere of 40% or greater with respect to an ion conductivity before exposure to the atmosphere, wherein the exposure to the atmosphere means exposure of the sulfide-based solid electrolyte to a condition of 20-25° C. and 50-70% humidity for 30 minutes to 3 hours.

The lithium-ion-conductive sulfide-based solid electrolyte may further contain an element selected from a group consisting of boron (B), carbon (C), nitrogen (N), aluminum (Al), silicon (Si), vanadium (V), manganese (Mn), iron (Fe), cobalt (Co), nickel (Ni), copper (Cu), zinc (Zn), gallium (Ga), germanium (Ge), arsenic (As), silver (Ag), cadmium (Cd), tin (Sn), antimony (Sb), tellurium (Te), lead (Pb), bismuth (Bi) and a combination thereof.

The method for preparing a lithium-ion-conductive sulfide-based solid electrolyte according to an exemplary embodiment of the present invention includes a step of mixing lithium sulfide ($Li_2S$), a sulfide-based raw material and indium selenide ($In_2Se_3$) and a step of milling the resulting mixture.

The sulfide-based raw material may be selected from a group consisting of $P_2S_3$, $P_2S_5$, $P_4S_3$, $P_4S_5$, $P_4S_7$, $P_4S_{10}$ and a combination thereof.

In the step of mixing, lithium sulfide ($Li_2S$), phosphorus pentasulfide ($P_2S_5$) and indium selenide ($In_2Se_3$) may be mixed at a molar ratio satisfying the composition of Chemical Formula 1:

$(Li_2S)_a \cdot (P_2S_5)_b \cdot (In_2Se_3)_c$  [Chemical Formula 1]

wherein $0.5 \leq a \leq 0.8$, $0.1 \leq b \leq 0.4$, $0.01 \leq c \leq 0.3$ and $a+b+c=1$.

The method for preparing a lithium-ion-conductive sulfide-based solid electrolyte may further include a step of heat-treating the milled mixture.

The heat treatment may be performed at 200-1200° C. for 1-3 hours.

In accordance with the lithium-ion-conductive sulfide-based solid electrolyte containing indium selenide and the method for preparing the same according to an exemplary embodiment of the present invention, the charge-discharge performance and energy efficiency of an all-solid-state battery can be improved and its life span can be increased remarkably.

The effect of the present invention is not limited to that described above. It should be understood that the effect of the present invention includes all the effects that can be inferred from the following description.

DETAILED DESCRIPTION

Figure 1:
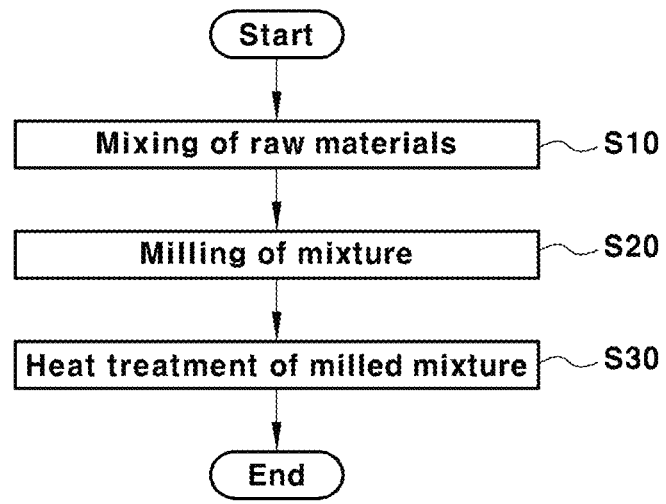
FIG. 1 is a schematic flow chart of a method for preparing a sulfide-based solid electrolyte according to an exemplary embodiment of the present invention.

Other objectives, features and advantages of the present invention will be easily understood through the specific exemplary embodiments and the attached drawings of the following detailed description. However, the present invention is not limited to the exemplary embodiments and may be embodied in other forms. On the contrary, the exemplary embodiments are provided so that the disclosure of the present invention is completely and fully understood by those of ordinary skill.

In the attached drawings, like numerals are used to represent like elements. In the drawings, the dimensions of the elements are magnified for easier understanding of the present invention. Although the terms first, second, etc. may be used to describe various elements, these elements should not be limited by the terms. The terms are used only to distinguish one element from another. For example, a first element can be termed a second element and, similarly, a second element can be termed a first element, without departing from the scope of the present invention. A singular expression includes a plural expression unless the context clearly indicates otherwise.

In the present disclosure, the terms such as "include", "contain", "have", etc. should be understood as designating that features, numbers, steps, operations, elements, parts or combinations thereof exist and not as precluding the existence of or the possibility of adding one or more other features, numbers, steps, operations, elements, parts or combinations thereof in advance. In addition, when an element such as a layer, a film, a region, a substrate, etc. is referred to as being "on" another element, it can be "directly on" the another element or an intervening element may also be present. Likewise, when an element such as a layer, a film, a region, a substrate, etc. is referred to as being "under" another element, it can be "directly under" the another element or an intervening element may also be present.

The sulfide-based solid electrolytes widely used currently include thio-LISICON-based materials such as $Li_3PS_4$, $Li_7P_3S_{11}$, etc. However, consisting only of lithium, phosphorus and sulfur, they are not practically applicable because they exhibit ion conductivity of 1 mS/cm or greater at room temperature only within very narrow compositional ranges. In addition, due to the atmospheric instability of the highly conductive sulfides, it is difficult to maintain high ion conductivity for a long time.

The present invention is directed to resolving the limitations and problems of the existing art and relates to a lithium-ion-conductive sulfide-based solid electrolyte containing lithium (Li), sulfur (S), phosphorus (P), indium (In) and selenium (Se).

Specifically, the sulfide-based solid electrolyte according to an exemplary embodiment of the present invention contains lithium (Li), sulfur (S), phosphorus (P), indium (In) and selenium (Se) and may be represented by Chemical Formula 1. In addition to the crystal structures resulting from bonding between lithium, sulfur and phosphorus, such as $Li_2S$, $Li_3PS_4$, etc., it may have a crystal structure of InSe.

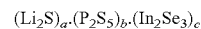

$(Li_2S)_a \cdot (P_2S_5)_b \cdot (In_2Se_3)_c$  [Chemical Formula 1]

wherein 0.5≤a≤0.8, specifically 0.65≤a≤0.8, 0.1≤b≤0.4, specifically 0.15≤b≤0.25, 0.01≤c≤0.3, specifically 0.02≤c≤0.2, and a+b+c=1.

The sulfide-based solid electrolyte according to an exemplary embodiment of the present invention has superior atmospheric stability because it has a crystal structure resulting from the presence of indium (In) and selenium (Se).

This may be explained with the principle of hard and soft acids and bases (HSAB).

According to the principle of hard and soft acids and bases (HSAB), indium (In) is defined as a borderline acid exhibiting weaker acidity than phosphorus (P). Therefore, indium (In) shows higher reactivity for sulfur (S) which is defined as a weaker base than for phosphorus (P) and also shows higher stability upon bonding.

Meanwhile, selenium (Se) is defined as a weak base exhibiting weaker basicity than sulfur (S). Therefore, selenium (Se) shows higher reactivity for indium (In) than for sulfur (S) and also shows higher stability upon bonding.

For this reason, the sulfide-based solid electrolyte according to an exemplary embodiment of the present invention may exhibit higher crystal structure stability than the existing sulfide-based solid electrolytes and this may lead to improved life span and energy efficiency of a battery.

The sulfide-based solid electrolyte according to an exemplary embodiment of the present invention may further contain a substitutional element. The substitutional element may be one or more elements selected from a group consisting of boron (B), carbon (C), nitrogen (N), aluminum (Al), silicon (Si), vanadium (V), manganese (Mn), iron (Fe), cobalt (Co), nickel (Ni), copper (Cu), zinc (Zn), gallium (Ga), germanium (Ge), arsenic (As), silver (Ag), cadmium (Cd), tin (Sn), antimony (Sb), tellurium (Te), lead (Pb), bismuth (Bi) and a combination thereof.

FIG. 1 is a schematic flow chart of a method for preparing a sulfide-based solid electrolyte according to an exemplary embodiment of the present invention.

Referring to FIG. 1, the method for preparing a sulfide-based solid electrolyte according to an exemplary embodiment of the present invention includes a step of mixing raw materials of a solid electrolyte (S10), a step of milling the resulting mixture (S20) and a step of heat-treating the milled mixture (S30). The heat treatment step may be omitted depending on purposes.

In the step of mixing the raw materials of the solid electrolyte (S10), lithium sulfide ($Li_2S$), a sulfide-based raw material and indium selenide ($In_2Se_3$) may be weighed to satisfy a specific molar ratio and then mixed.

As the raw materials of the solid electrolyte, not only compounds such as lithium sulfide, etc. but also simple substances such as elemental sulfur, phosphorus, lithium, indium, selenium, etc. may be used.

Preferably, the lithium sulfide, containing fewer impurities, may be used to prevent side reactions. The lithium sulfide may be synthesized by the method of Japanese Patent Publication No. 7-330312 GP 7-330312 A) and may be purified by the method of International Patent Publication No. WO 2005/040039.

The sulfide-based raw material may be a phosphorus sulfide selected from a group consisting of $P_2S_3$, $P_2S_5$, $P_4S_3$, $P_4S_5$, $P_4S_7$, $P_4S_{10}$ and a combination thereof. Preferably, phosphorus pentasulfide ($P_2S_5$) may be used.

Specifically, in the step of mixing the raw materials of the solid electrolyte (S10), lithium sulfide, phosphorus pentasulfide and indium selenide may be weighed at a molar ratio satisfying the composition of Chemical Formula 1 and then mixed.

In the step of milling the resulting mixture (S20), the mixture may be amorphized by mechanical milling.

The mechanical milling may be performed by using a ball mill such as a power ball mill, a vibration ball mill, a planetary ball mill, etc., a container-fixed type mixing grinding machine such as spiral-type, ribbon-type, screw-type, high-speed-type machines, or a hybrid mixing grinding machine such as cylinder-type, twin cylinder-type, horizontal cylinder-type, V-type and double cone-type machines, although not being particularly limited thereto.

In the step of heat-treating the milled mixture (S30), the amorphized milled mixture may be crystallized by heat-treating the milled mixture at 200-1200° C. for 1-3 hours.

Figure 2:
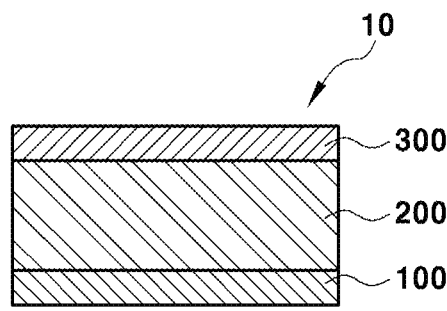
FIG. 2 is a cross-sectional view of an all-solid-state battery according to an exemplary embodiment of the present invention.

FIG. 2 is a cross-sectional view of an all-solid-state battery according to an exemplary embodiment of the present invention.

Referring to FIG. 2, the all-solid-state battery 10 contains an anode 300, a cathode 100 and an electrolyte layer 200 consisting of a solid electrolyte, interposed between the anode 300 and the cathode 100.

The all-solid-state battery 10 may contain the sulfide-based solid electrolyte described above in one or more of the anode 300, the cathode 100 and the electrolyte layer 200.

The present invention will be described in more detail through examples. The following examples are for illustrative purposes only and it will be apparent to those skilled in the art that the scope of this invention is not limited by the examples.

Examples 1-10

(1) Lithium sulfide ($Li_2S$), phosphorus pentasulfide ($P_2S_5$) and indium selenide ($In_2Se_3$) were weighed at a molar ratio described in Table 1 and then mixed sufficiently.

(2) The resulting mixture was loaded into a milling container made of zirconia ($ZrO_2$) and equipped with a gas sealing device. As a grinding medium, zirconia beads (diameter: about 3 mm) were used. Continuous milling was conducted at about 550 rpm for about 9 hours by planetary milling.

(3) The milled mixture was heat-treated under an argon gas atmosphere at about 260° C. for about 2 hours to obtain a sulfide-based solid electrolyte.

Comparative Examples 1-5

(1) Lithium sulfide ($Li_2S$) and phosphorus pentasulfide ($P_2S_5$) were weighed at a molar ratio described in Table 1 and then mixed sufficiently.

(2) The resulting mixture was loaded into a milling container made of zirconia ($ZrO_2$) and equipped with a gas sealing device. As a grinding medium, zirconia beads (diameter: about 3 mm) were used. Continuous milling was conducted at about 550 rpm for about 9 hours by planetary milling.

(3) The milled mixture was heat-treated under an argon gas atmosphere at about 260° C. for about 2 hours to obtain a sulfide-based solid electrolyte.

TABLE 1

| Classification | Compositional ratio $(Li_2S)_a \cdot (P_2S_5)_b \cdot (In_2Se_3)_c$, (a + b + c = 1) | | | Ion conductivity at room temperature[3] [mS/cm] |
|---|---|---|---|---|
| | a | b | c | |
| Example 1 | 0.720 | 0.240 | 0.040 | 1.16 |
| Example 2 | 0.737 | 0.210 | 0.053 | 2.05 |
| Example 3 | 0.762 | 0.190 | 0.048 | 1.70 |
| Example 4 | 0.800 | 0.160 | 0.040 | 1.06 |
| Example 5 | 0.757 | 0.216 | 0.027 | 2.30 |
| Example 6 | 0.769 | 0.154 | 0.077 | 0.95 |
| Example 7 | 0.692 | 0.231 | 0.077 | 1.00 |
| Example 8 | 0.667 | 0.167 | 0.166 | 0.76 |
| Example 9 | 0.727 | 0.182 | 0.091 | 1.60 |
| Example 10 | 0.700 | 0.200 | 0.100 | 1.40 |
| Comparative Example 1[1] | 0.750 | 0.250 | 0 | 0.50 |
| Comparative Example 2[2] | 0.700 | 0.300 | 0 | 2.30 |
| Comparative Example 3 | 0.778 | 0.222 | 0 | 0.14 |
| Comparative Example 4 | 0.800 | 0.200 | 0 | 0.83 |
| Comparative Example 5 | 0.833 | 0.167 | 0 | 0.50 |
| Comparative Example 6 | 0.600 | 0.400 | 0 | 0.09 |

[1]Comparative Example 1: $Li_3PS_4$.
[2]Comparative Example 2: $Li_7P_3S_{11}$.
[3]Ion conductivity at room temperature was measured in Test Example 2.

Test Example 1

The crystallinity of the sulfide-based solid electrolytes according to Example 2 and Comparative Example 1 was evaluated by X-ray diffraction (XRD) analysis. Each sulfide-based solid electrolyte was placed on a sealed sample holder for XRD and measurement was made with a scan rate of about 2°/min from about 10 to 60° (2θ). The result is shown in FIG. 3.

Figure 3:
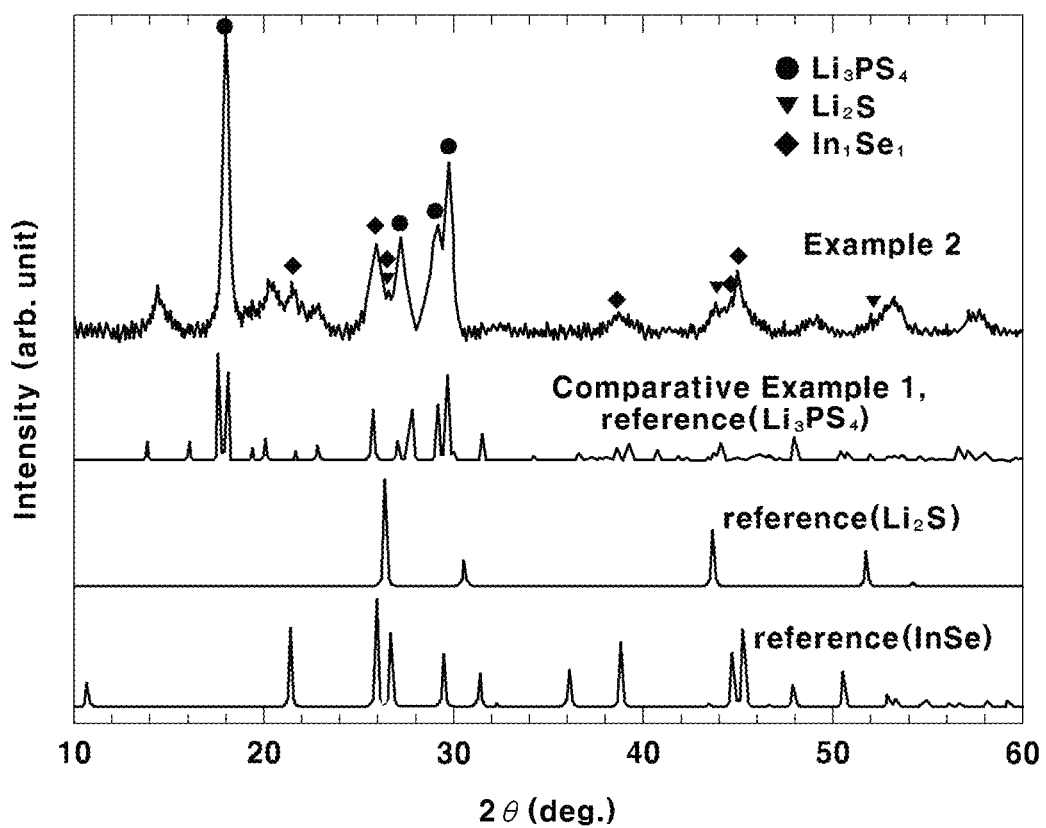
FIG. 3 shows an X-ray diffraction (XRD) analysis result of sulfide-based solid electrolytes according to Example 2 and Comparative Example 1.

Referring to FIG. 3, it can be seen that the sulfide-based solid electrolyte according to an exemplary embodiment of the present invention includes the crystal structure of InSe in addition to the crystal structures of $Li_2S$ and $Li_3PS_4$. Specifically, the XRD peaks of InSe were observed at 2θ=20-22°, 2θ=26-28°, 2θ=38-40° and 2θ=44-46°.

Test Example 2

In order to evaluate the lithium ion conductivity of the sulfide-based solid electrolytes according to Examples 1-10 and Comparative Examples 1-6, alternating current (AC) impedance analysis was conducted at room temperature for each sample.

Each sulfide-based solid electrolyte was loaded into a conductivity measurement mold made of SUS (steel use stainless) and a sample with a diameter of about 6 mm and a thickness of about 0.6 mm was prepared by uniaxial cold pressing under the condition of 300 MPa.

The ion conductivity at room temperature could be measured by applying an AC voltage of about 50 mV to the sample and measuring impedance while sweeping frequencies from $1 \times 10^7$ to 1 Hz. The result is shown in Table 1. The result was also represented as a ternary contour map as shown in FIG. 4.

Referring to Table 1, it can be seen that the sulfide-based solid electrolytes of Comparative Examples 1-6 not containing indium (In) and selenium (Se) show ion conductivity of 1 mS/cm or greater only within a very narrow range (Comparative Example 2, a=0.7, b=0.3).

In contrast, it can be seen from Table 1 that the sulfide-based solid electrolytes of Examples 1-10 satisfying the composition of Chemical Formula 1 according to an exemplary embodiment of the present invention show high ion conductivity greater than or close to 1 mS/cm in a very broad compositional range.

Figure 4:
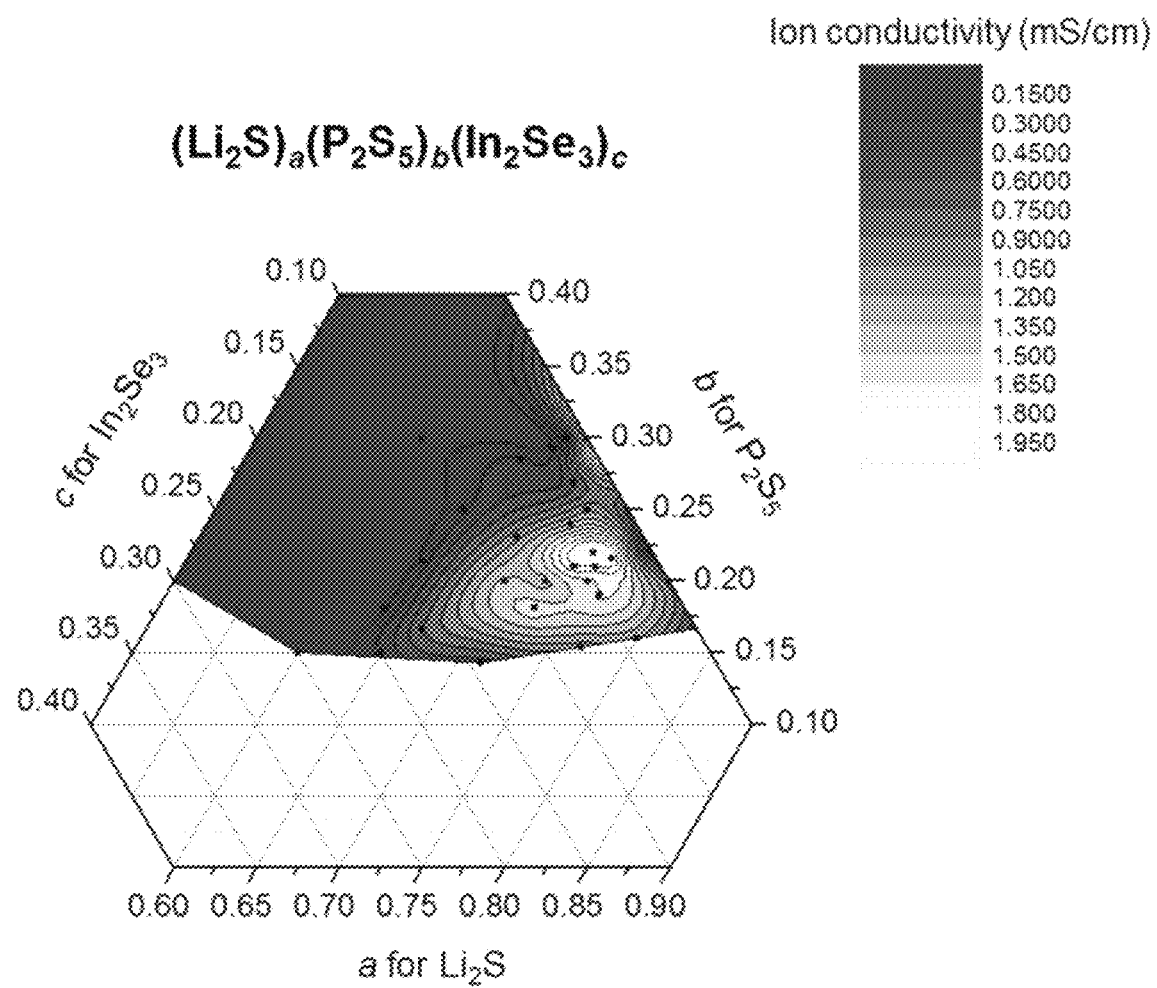
FIG. 4 shows a result of measuring the ion conductivity of $(Li_2S)_a \cdot (P_2S_5)_b \cdot (In_2Se_3)_c$ (a+b+c=1) represented by a ternary contour map.

Referring to FIG. 4, it can be seen that the sulfide-based solid electrolytes according to an exemplary embodiment of the present invention show high ion conductivity when a, b and c in Chemical Formula 1 satisfy the following conditions: $0.65 \leq a \leq 0.8$, $0.15 \leq b \leq 0.25$ and $0.02 \leq c \leq 0.2$.

$$(Li_2S)_a \cdot (P_2S_5)_b \cdot (In_2Se_3)_c \quad \text{[Chemical Formula 1]}$$

Test Example 3

In order to evaluate the atmospheric stability of the sulfide-based solid electrolytes according to Example 2 and Comparative Example 2, each sulfide-based solid electrolyte was exposed to the atmosphere and ion conductivity was measured at room temperature. The result was compared with the initial value (before exposure to the atmosphere).

Figure 5:
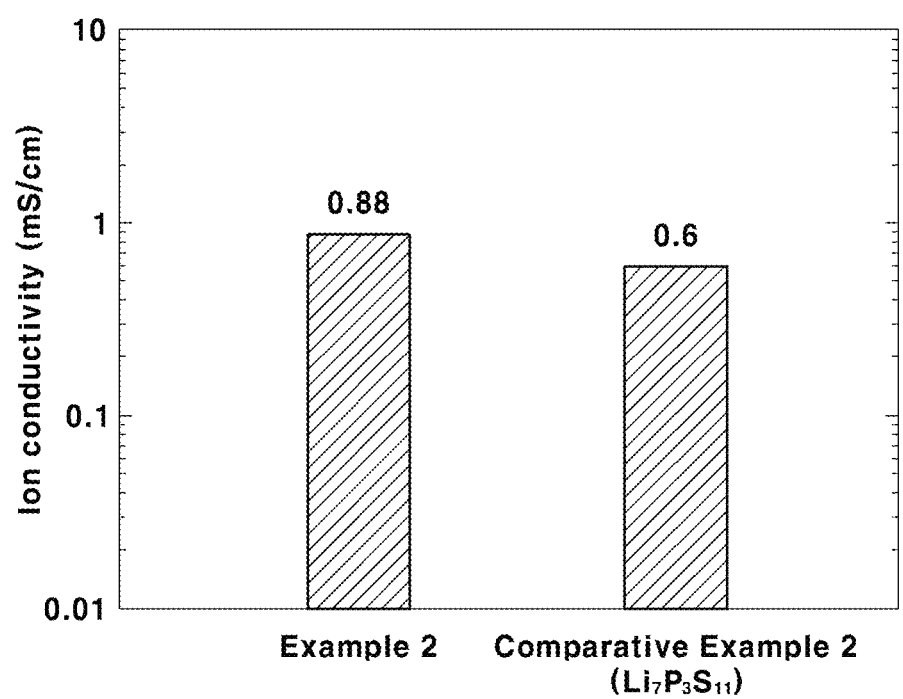
FIG. 5 shows a result of exposing sulfide-based solid electrolytes according to Example 2 and Comparative Example 2 to the atmosphere and then measuring ion conductivity at room temperature.

Each sulfide-based solid electrolyte was placed in a vial and then exposed to the atmosphere of about 25° C. and about 60% humidity through a thermo-hygrostat for about 1 hour. The sulfide-based solid electrolyte was recovered and ion conductivity was measured at room temperature as described in Test Example 2. The result is shown in FIG. 5.

The ion conductivity at room temperature for Example 2 and Comparative Example 2 after the exposure to the atmosphere (FIG. 5) was compared with the ion conductivity at room temperature for Example 2 and Comparative Example 2 given in Table 1. The result is shown in Table 2.

TABLE 2

| Classification | Ion conductivity at room temperature before exposure to the atmosphere [mS/cm] | Ion conductivity at room temperature after exposure to the atmosphere [mS/cm] | Maintenance [%][1] |
|---|---|---|---|
| Example 2 | 2.05 | 0.88 | 43.0% |
| Comparative Example 2 | 2.30 | 0.6 | 26.0% |

[1]Maintenance [%] = (ion conductivity at room temperature after exposure to the atmosphere)/(ion conductivity at room temperature before exposure to the atmosphere) × 100

Referring to Table 2, it can be seen that the sulfide-based solid electrolyte according to an exemplary embodiment of the present invention (Example 2) maintains about 40% or higher of the ion conductivity at room temperature even after the exposure to the atmosphere, whereas Comparative Example 2 shows that the ion conductivity at room temperature is decreased greatly to about 26.0%. This is because the sulfide-based solid electrolyte according to an exemplary embodiment of the present invention has high crystal structure stability due to the presence of indium (In) and selenium (Se).

While the test examples and examples of the present invention have been described in detail, the scope of the present invention is not limited by the test examples and examples. In addition, various changes and modifications that can be made by those skilled in the art based on the basic concept of the present invention defined in the appended claims are also included in the scope of the present invention.

What is claimed is:

1. A lithium-ion-conductive sulfide-based solid electrolyte comprising:
   lithium (Li);
   sulfur (S);
   phosphorus (P);
   indium (In); and
   selenium (Se),
   wherein said Li, S, P, In and Se of the electrolyte are represented by the following formula:

$$(Li_2S)_a \cdot (P_2S_5)_b \cdot (In_2Se_3)_c,$$

wherein $0.5 \leq a \leq 0.8$, $0.1 \leq b \leq 0.4$, $0.01 \leq c \leq 0.3$, and $a+b+c=1$.

2. The lithium-ion-conductive sulfide-based solid electrolyte according to claim 1, which has a crystal structure of InSe.

3. The lithium-ion-conductive sulfide-based solid electrolyte according to claim 1, which shows XRD peaks of InSe at $2\theta=20\text{-}22°$, $2\theta=26\text{-}28°$, $2\theta=38\text{-}40°$ and $2\theta=44\text{-}46°$ when subjected to X-ray diffraction (XRD) pattern measurement using Cu Kα radiation.

4. The lithium-ion-conductive sulfide-based solid electrolyte according to claim 1, wherein $0.65 \leq a \leq 0.8$, $0.15 \leq b \leq 0.25$ and $0.02 \leq c \leq 0.2$.

5. The lithium-ion-conductive sulfide-based solid electrolyte according to claim 1, which has an ion conductivity after exposure to the atmosphere of 40% or greater with respect to an ion conductivity before exposure to the atmosphere, wherein the exposure to the atmosphere means exposure of the sulfide-based solid electrolyte to a condition of 20-25° C. and 50-70% humidity for 30 minutes to 3 hours.

6. The lithium-ion-conductive sulfide-based solid electrolyte according to claim 1, which further comprises an element selected from a group consisting of boron (B), carbon (C), nitrogen (N), aluminum (Al), silicon (Si), vanadium (V), manganese (Mn), iron (Fe), cobalt (Co), nickel (Ni), copper (Cu), zinc (Zn), gallium (Ga), germanium (Ge), arsenic (As), silver (Ag), cadmium (Cd), tin (Sn), antimony (Sb), tellurium (Te), lead (Pb), bismuth (Bi) and a combination thereof.

7. A method for preparing a lithium-ion-conductive sulfide-based solid electrolyte, comprising:
   mixing lithium sulfide ($Li_2S$), a sulfide-based raw material and indium selenide ($In_2Se_3$); and
   milling the resulting mixture, and
   wherein the lithium-ion-conductive sulfide-based solid electrolyte is represented by the following formula:

$$(Li_2S)_a \cdot (P_2S_5)_b \cdot (In_2Se_3)_c,$$

wherein $0.5 \leq a \leq 0.8$, $0.1 \leq b \leq 0.4$, $0.01 \leq c \leq 0.3$, and $a+b+c=1$.

8. The method for preparing a lithium-ion-conductive sulfide-based solid electrolyte according to claim 7, wherein the sulfide-based raw material is selected from a group consisting of $P_2S_3$, $P_2S_5$, $P_4S_3$, $P_4S_5$, $P_4S_7$, $P_4S_{10}$ and a combination thereof.

9. The method for preparing a lithium-ion-conductive sulfide-based solid electrolyte according to claim 7, wherein the lithium sulfide ($Li_2S$), the indium selenide ($In_2Se_3$), and phosphorus pentasulfide ($P_2S_5$) are mixed.

10. The method for preparing a lithium-ion-conductive sulfide-based solid electrolyte according to claim 7, which further comprises heat-treating the milled mixture.

11. The method for preparing a lithium-ion-conductive sulfide-based solid electrolyte according to claim 10, wherein the heat-treating is performed at 200-1200° C. for 1-3 hours.

12. An all-solid-state battery comprising:
an anode;
a cathode; and
an electrolyte layer interposed between the anode and the cathode,
wherein one or more of the anode, the cathode and the electrolyte layer comprises the lithium-ion-conductive sulfide-based solid electrolyte according to claim 1.

* * * * *